US010189417B1

(12) United States Patent
Morken

(10) Patent No.: US 10,189,417 B1
(45) Date of Patent: Jan. 29, 2019

(54) SLIDING AUTOMOBILE ROOF RACK

(71) Applicant: David R. Morken, Golden Valley, AZ (US)

(72) Inventor: David R. Morken, Golden Valley, AZ (US)

(*) Notice: Subject to any disclaimer, the term of this patent is extended or adjusted under 35 U.S.C. 154(b) by 0 days.

(21) Appl. No.: 15/942,605

(22) Filed: Apr. 2, 2018

Related U.S. Application Data

(60) Provisional application No. 62/534,724, filed on Jul. 20, 2017.

(51) Int. Cl.
*B60R 9/042* (2006.01)
*B60R 9/058* (2006.01)

(52) U.S. Cl.
CPC .............. *B60R 9/042* (2013.01); *B60R 9/058* (2013.01)

(58) Field of Classification Search
CPC ................................ B60R 9/042; B60R 9/058
USPC ........................................ 224/321, 310, 309
See application file for complete search history.

(56) References Cited

U.S. PATENT DOCUMENTS

| | | | | |
|---|---|---|---|---|
| 3,460,694 A * | 8/1969 | Simms | ................... | B60P 3/1025 414/462 |
| 4,081,095 A * | 3/1978 | Wilburn | ................... | B60R 9/042 414/462 |
| 4,446,998 A * | 5/1984 | Taig | ................... | B60R 9/042 224/310 |
| 5,417,358 A * | 5/1995 | Haselgrove | ................... | B60R 9/042 224/310 |
| 5,421,495 A * | 6/1995 | Bubik | ................... | B60R 9/042 224/282 |
| 5,535,929 A * | 7/1996 | Neill | ................... | B60R 9/042 224/310 |
| 5,544,796 A * | 8/1996 | Dubach | ................... | B60R 9/042 224/310 |
| 5,884,824 A * | 3/1999 | Spring, Jr. | ................... | B60R 9/042 224/309 |
| 6,105,840 A * | 8/2000 | Trevino | ................... | B60R 9/042 224/309 |
| 6,158,638 A * | 12/2000 | Szigeti | ................... | B60R 9/042 224/310 |
| 6,164,236 A * | 12/2000 | Liu | ................... | B63C 9/22 114/343 |
| 6,308,874 B1 * | 10/2001 | Kim | ................... | B60R 9/042 224/309 |

(Continued)

FOREIGN PATENT DOCUMENTS

CN 101734202 6/2010

OTHER PUBLICATIONS

Google Translation of Foreign Patent, CN101734202, Jianzhong Qin, [From the Internet], Apr. 2, 2018: https://patents.google.com/patent/CN101734202B/en.

*Primary Examiner* — Nathan J Newhouse
*Assistant Examiner* — Lester L Vanterpool
(74) *Attorney, Agent, or Firm* — Cramer Patent & Design, PLLC; Aaron R. Cramer

(57) ABSTRACT

A sliding roof rack includes a base frame which is capable of being removably secured to the roof of an automobile and a movable frame which is configured to either lock in position upon the base frame or be slidingly disengaged and be partially tilted over a side of the vehicle. The sliding mechanism permits an upper portion of the movable frame to remain secured to the base frame while the lower portion of the frame is free to pivot downward along the side of the vehicle.

12 Claims, 3 Drawing Sheets

(56) References Cited

U.S. PATENT DOCUMENTS

| | | | |
|---|---|---|---|
| 6,338,427 B1 * | 1/2002 | Aftanas | B60R 9/042 224/309 |
| 6,520,393 B1 * | 2/2003 | Ferguson | B60R 9/042 224/310 |
| 6,679,407 B2 * | 1/2004 | Weeks | B60R 9/042 224/310 |
| 6,681,970 B2 * | 1/2004 | Byrnes | B60R 9/042 224/310 |
| 6,715,652 B2 * | 4/2004 | Kmita | B60R 9/042 224/310 |
| 6,761,296 B2 * | 7/2004 | Ford | B60R 3/005 224/310 |
| 6,874,835 B1 * | 4/2005 | Silverness | B60P 3/40 224/310 |
| 7,011,239 B2 * | 3/2006 | Williams | B60R 9/042 224/310 |
| 7,108,162 B2 * | 9/2006 | Stadler | B60R 9/042 224/310 |
| 7,226,266 B2 * | 6/2007 | Henderson | B60R 9/042 414/462 |
| 8,640,933 B1 * | 2/2014 | McCray | B60R 9/042 224/310 |
| 9,371,040 B2 * | 6/2016 | Townsend | B60R 9/045 |
| 9,914,400 B1 * | 3/2018 | Johnsrud | H05K 999/99 |
| 2002/0185506 A1 * | 12/2002 | Kmita | B60R 9/042 224/310 |
| 2003/0052145 A1 * | 3/2003 | Aftanas | B60R 9/042 224/310 |
| 2004/0028510 A1 * | 2/2004 | Jones | B60R 9/042 414/462 |
| 2004/0173651 A1 * | 9/2004 | Kim | B60R 9/042 224/310 |
| 2004/0188478 A1 | 9/2004 | Williams | |
| 2005/0092796 A1 * | 5/2005 | Essig | B60R 9/00 224/321 |
| 2005/0095102 A1 * | 5/2005 | Watson | B60R 9/042 414/462 |
| 2006/0065685 A1 * | 3/2006 | Fitzsimmons | B60R 9/042 224/310 |
| 2006/0280583 A1 | 12/2006 | Settelmayer | |
| 2007/0090139 A1 * | 4/2007 | McKenzie | B60R 3/005 224/310 |
| 2013/0062378 A1 | 3/2013 | Hobbs | |
| 2013/0248567 A1 | 9/2013 | Townsend | |
| 2014/0097219 A1 * | 4/2014 | Reiber | B60R 9/055 224/310 |
| 2015/0069101 A1 | 3/2015 | Presley | |

\* cited by examiner

SLIDING AUTOMOBILE ROOF RACK

RELATED APPLICATIONS

The present invention was first described in and claims the benefit of U.S. Provisional Application No. 62/534,724 filed Jul. 20, 2017, the entire disclosures of which are incorporated herein by reference.

FIELD OF THE INVENTION

The present invention relates generally to the field of sliding automobile roof racks.

BACKGROUND OF THE INVENTION

On highways today, it is a common sight to see bulky or extraneous objects or luggage being transported on the roofs of motor vehicles. These items being transported may include bicycles, surfboards, skis, canoes, kayaks, individual pieces of luggage, weather-proof and streamlined luggage carriers and even building materials. Many vehicles, especially SUV's, are equipped with roof top luggage racks to help distribute the load and make securing the load easier all the while avoiding damage to the vehicle roof.

However, no matter the intended purpose or functionality of the item to be stored, the ability to get the items on and off the roof is required and therein lies the problem. This lifting requirement may prove to be a difficult task for most people who must often rely upon ladders or climbing upon the vehicle all the while working at precarious angles, heights and positions well above ground. In some cases, people have even been known to climb on the roof of the vehicle itself not only risking injury, but unsightly and costly damage to the roof.

Many efforts have been made to address this problem such as U.S. Pat. No. 5,417,358, and U.S. Pat. App. Pub. Nos. 2006/0280583, 2005/0095102 and 2015/0069101. However, these devices are unsatisfactory in both ease of installation and operation. Accordingly, there is a need for a means by which large or bulky, but otherwise lightweight objects can be safely and securely placed upon and removed from the roof of a motor vehicle without the irritants, dangers and damages as described above. The device of the instant application accomplishes this task.

SUMMARY OF THE INVENTION

The principles of the present invention provide for a sliding roof rack including a base, a rack slidably engaging a top of the base, and a supporting assembly pivotally attached to and capable of lengthwise movement along a portion of the rack. The base is adapted to be removably secured to a roof of an automobile. The rack is slidingly and movably secured to said base. A user can adaptably manipulate the rack from a stored position upon the base to a downward angular position adjacent a side of the automobile and a user can adaptably manipulate the supporting assembly to support a load on the rack. In certain embodiments, a pair of sliding assemblies are provided, each attached to a different portion of the rack.

As such, it is an object of the present invention to provide such a base having a first rail having a first channel in environmental communication with a first interior hollow portion, a second rail having a second channel in environmental communication with a second interior hollow portion, a first crossmember disposed between the first and rail adjacent a first rail first end and a second rail first end, and a second crossmember disposed between the first and rail adjacent a first rail second end and a second rail second end. In at least one (1) embodiment, the first rail, second rail, first crossmember, and second crossmember are connected to form a polygonal frame.

It is an object of the present invention to provide such a rack having a rack first rail, a rack second rail, a rack first crossmember disposed between the rack first and rack second rail, a rack second crossmember disposed between the rack first and rack second rail, a plurality of luggage rack luggage rails each disposed between the rack first and rack second rail, and a pair of sliders secured beneath the rack adjacent each corner of the rack first crossmember and rack second crossmember. The pair of sliders each slidably interact with portions of the base, typically within a respective channel. The supporting assembly slidably interacts with either the rack first or second rail. In at least one (1) embodiment, the rack first rail, rack second rail, rack first crossmember, and rack second crossmember are connected to form a polygonal frame.

It is another object of the present invention to provide such a supporting assembly to include a first movable hinge slidably interacting with a respective rack rail, a support plate having a first end attached to the first movable hinge and a slot located at a second end, a second movable hinge attached to an intermediate location on a first side of the support plate, a third movable hinge slidably interacting with a respective rack rail, a support brace, having a first end pivotally attached to the second movable hinge and a second end attached to the third movable hinge, and a locking knob attached to the third movable hinge and capable of securing a relative position of the third movable hinge relative to the respective rack rail. The locking knob is capable of securing the support plate second end to the respective rail when passing through the slot.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
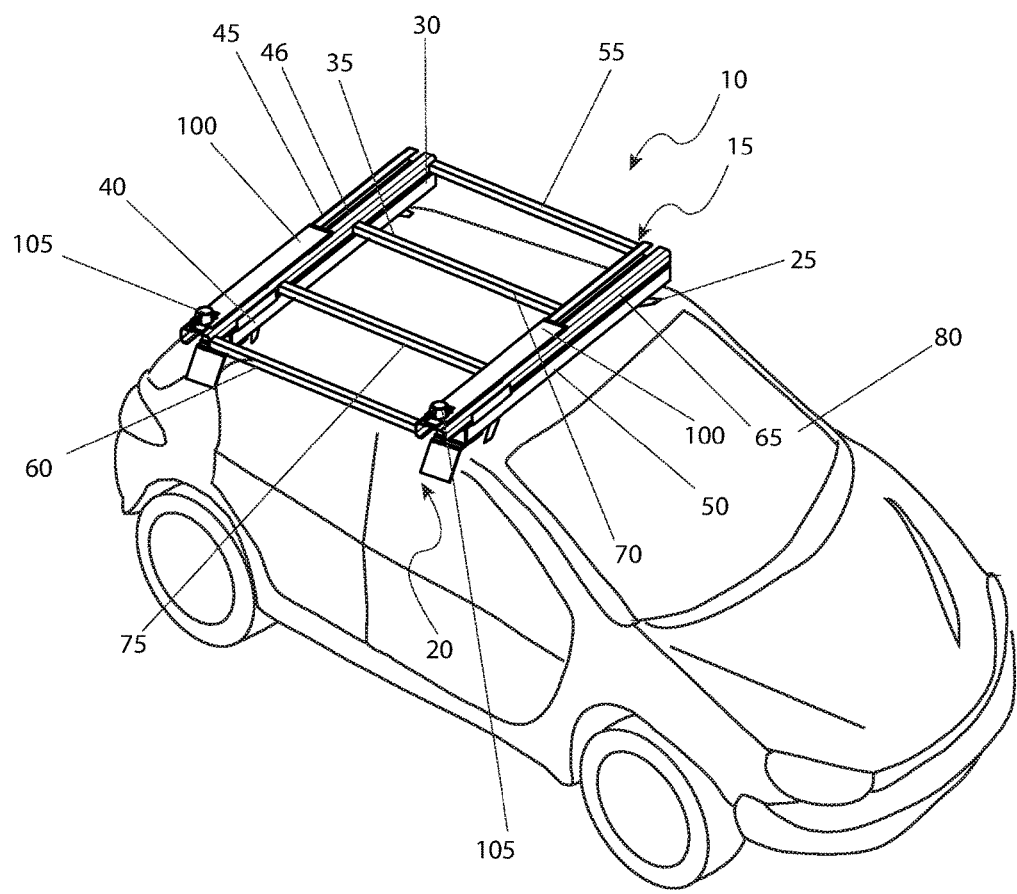
FIG. 1 is a perspective view of a sliding automobile roof rack 10 on an automobile 80, with the sliding rack 20 in a stored configuration upon the base 15 according to a preferred embodiment of the present invention.

DESCRIPTIVE KEY 10 sliding automobile roof rack
15 base
20 sliding rack
25 first base rail
30 second base rail
35 first base crossmember
40 second base crossmember
45 sliding rack first rail 46 sliding rack first rail channel
50 sliding rack second rail
51 sliding rack second rail channel
55 sliding rack first crossmember
60 sliding rack second crossmember
65 sliding rack first luggage rail
70 sliding rack second luggage rail
75 sliding rack third luggage rail
80 automobile
85 first channel
86 first slider
90 second channel
91 second slider
100 support plate
101 slot
105 locking knob
110 first movable hinge
120 third slider
121 fourth slider
125 support brace
130 second movable hinge
140 third movable hinge
145 travel path "t"

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a perspective view of a sliding automobile roof rack 10 (hereinafter the "device" 10) adaptably secured to an automobile 80 with a sliding rack 20 in a stored configuration upon the base 15, according to a preferred embodiment of the present invention, is disclosed. The device 10 comprises a base 15, which is removably securable to the roof of an automobile 80, and a sliding rack 20. The base 15 comprises a first rail 25 and a second rail 30 joined across an upper and lower span between the first rail 25 and the second rail 30 by a first crossmember 35 and a second crossmember 40. The first rail 25, second rail 30, first crossmember 35 and second crossmember 40 are connected to form a polygonal frame having four (4) right interior corner angles. The first rail 25 and second rail 30 each comprise an interior hollow portion which is in environmental communication with a lengthwise first channel 85 and second channel 90, respectively.

The sliding rack 20 comprises a sliding rack first rail 45 and a sliding rack second rail 50 joined across an upper and lower span between the sliding rack first rail 45 and sliding rack second rail 50 by a sliding rack first crossmember 55 and a sliding rack second crossmember 60. The sliding rack first rail 45, sliding rack second rail 50, sliding rack first crossmember 55 and sliding rack second crossmember 60 are connected to form a polygonal frame having four (4) right interior corner angles. Separating the interior space of the sliding rack 20 into four (4) equally-sized spaces are a sliding rack first luggage rail 65, a sliding rack second luggage rail 70 and a sliding rack third luggage rail 75. Each luggage rail 65, 70 and 75 is secured in a position that is perpendicular to the sliding rack first rail 45 and the sliding rack second rail 50. Adjacent the sliding rack first crossmember 55 and adjacent each corner of an underside surface of the sliding rack 20 are secured a pair of sliders 86, 91. Each of the pair of sliders 86, 91 is configured to slidingly occupy the interior hollow portion of the first rail 25 and the second rail 30. The interior hollow portion of the first rail 25 and the second rail 30 is accessed by each pair of sliders 86, 91 by a lengthwise first channel 85 and second channel 90, respectively, which is in environmental communication with the interior hollow. Preferably, each slider 86, 91 is generally shaped as an inverted "T", such that the wings of the "T" cannot exit the interior portion of the respective rail 25, 30 through the respective channel 85, 90. Also visible are two (2) support plates 100 and two (2) locking knobs 105, each attached to the sliding rack first rail 45 and the sliding rack second rail 50 to aid in holding of objects during the hoisting and lowering process. Further detail on construction and operation of the support plates 100 and locking knobs 105 will be provided herein below.

Figure 2:
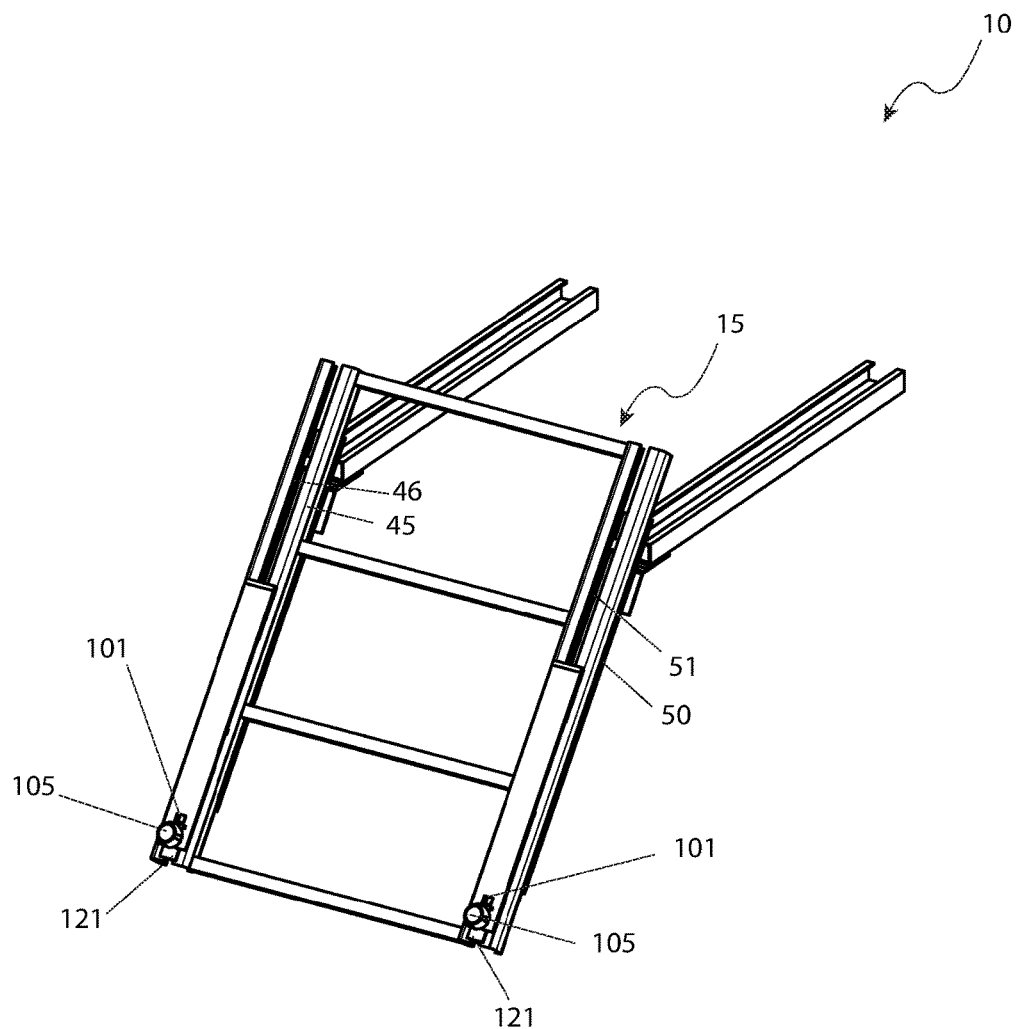
FIG. 2 is a perspective view of a sliding automobile roof rack 10 on an automobile 80, with a sliding rack 20 in a deployed and disconnected configuration from a base 15 according to a preferred embodiment of the present invention; and, FIG. 3 is detailed view of the support plate 100 as used with the sliding automobile roof rack 10, according to a preferred embodiment of the present invention.

Referring now to FIG. 2, a perspective view of a sliding automobile roof rack 10 adaptably secured to an automobile 80, with a sliding rack 20 in a deployed and disconnected configuration from a base 15 according to a preferred embodiment of the present invention is disclosed. The sliding rack 20 is displayed in a deployed and disconnected configuration for illustration purposes only. In the ideal configuration, the sliding rack 20 would remain pivotally and slidingly secured to the base 15 by means of a pair of hinges located at the distal ends of the base rails 25, 30 on the same side of the automobile 80. These hinges would be positioned such that the pair of sliders 86, 91 can enter the interior portion of the respective rail 25, 30, through a correspondingly-shaped widening of the respective channel 85, 90. Given this configuration, the sliding rack 20 is configured to permit a user to pull the sliding rack 20 from the stored position as illustrated in FIG. 1 to a deployed position along a door side edge of an automobile 80 similar to the illustration in FIG. 2. The support plate 100 and a locking knob 105 remain visible in the illustrated orientation.

Figure 3:
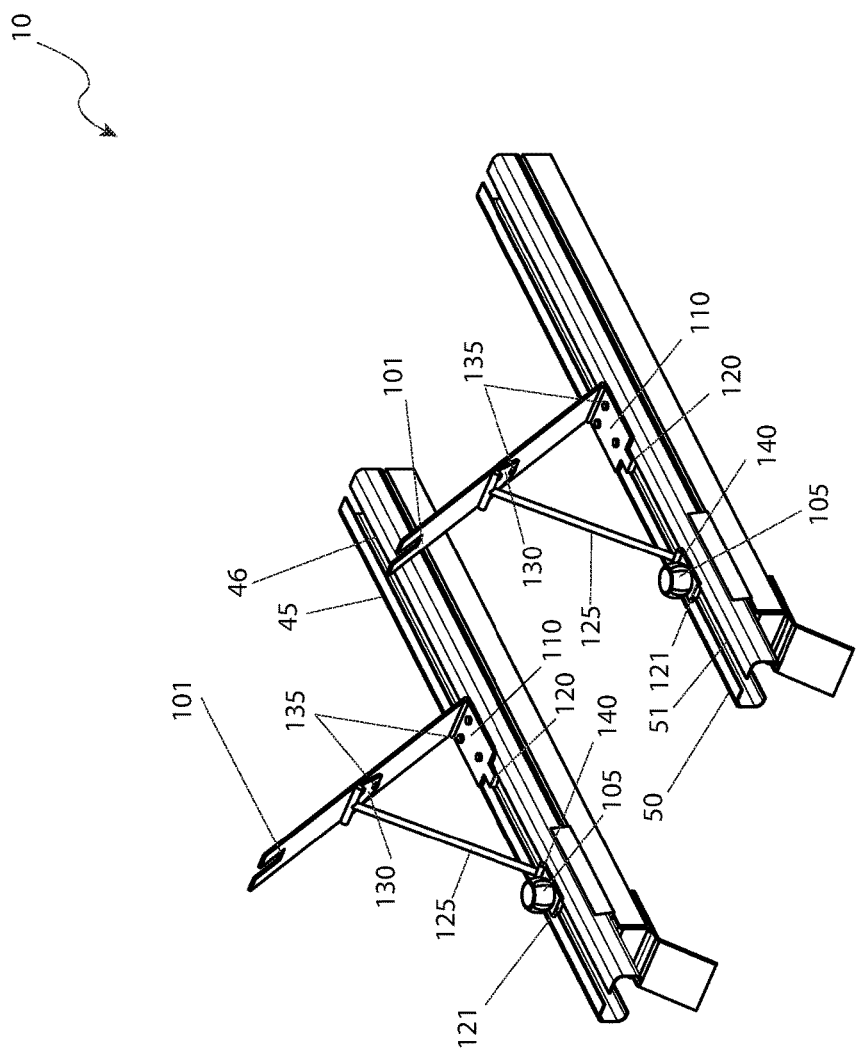

Referring next to FIG. 3, a detailed view of the support plate 100 as used with the sliding automobile roof rack 10, according to a preferred embodiment of the present invention is depicted. A first end of the support plate 100 is movably positionable within the respective sliding rack rail 45, 50 by attachment to a first movable hinge 110 held within a respective rack channel 46, 51 with a third slider 120. The third slider 120 is also generally an inverted "T"-shape not capable of full vertical removal from the respective rack channel 46, 51, but enabling the first movable hinge 110 to travel lengthwise along the respective sliding rack rail 45, 50. The support plate 100 is braced to a near a ninety degree (90°) position with a support brace 125. A first end of the support brace 125 is pivotally attached at an intermediate position of the support plate 100 with a second movable hinge 130 with fasteners such as bolts, screws, rivets, or the like. Preferably, the first movable hinge 110 and second movable hinge 130 are on the same side of the support plate 100. The second end of the support brace 125 is movably positionable within the respective sliding rack rail 45, 50 by attachment to a third movable hinge 140 with fasteners. A fourth slider 121 enables the third movable hinge 140 to be travel lengthwise along the respective sliding rack rail 45, 50. The fourth slider 121 is also generally an inverted "T"-shape not capable of full vertical removal from the respective rack channel 46, 51. The third movable hinge 140 is held in place to the respective sliding rack trail 45, 50 by a locking knob 105, envisioned to lock in place by tightening and unlock by loosening in a well-known manner. Thus, the locking knob 105 may be loosened and the lowest portion of the support plate 100 (nearest the first movable hinge 110) moved back and forth along a travel path "t" 145. This action allows the support plate 100 to lay flat (parallel) to the respective sliding rack rail 45, 50 at one (1) extreme, and form a near ninety degree (90°) angle at the other extreme. The second end of the support brace 100 has a slot 101. The slot 101 comes in handy when the support brace 100 is fully collapsed against the respective sliding rack rail 45, 50. When that is accomplished, the slot 101 is sized to enable the locking knob 105 to secure the support brace 100 to the respective sliding rack rail 45, 50 to eliminate unwanted deployment, particularly during travel.

During use, a load is positioned on the sliding rack first rail 45 and sliding rack second rail 50 and supported by the support plate 100 when it is fully deployed. This configuration allows for the easy positioning of the load at a lower elevation than that on top of the automobile 80. Once positioned, a single user may simply lift upon the sliding rack second crossmember 60 to raise the device 10 up onto the first base rail 25 and second base rail 30. This process is reversed when removing the load from the top of the automobile 80.

The preferred embodiment of the present invention can be utilized by the common user in a simple and effortless manner with little or no training. It is envisioned that the device 10 would be constructed in general accordance with FIGS. 1 through 4 utilizing tubular sheet metal. A user, upon procuring the device 10 would secure the base 15 to the roof of an automobile 80 by commonly accepted attachment methods such as C-clamps or nylon straps (not shown). It is envisioned however that other forms of attachment are acceptable.

Upon securement of the base 15 to the roof of an automobile 80, a user may pull the sliding rack 20 out and away from the roof of the automobile 80, towards the user with the sliding rack 20 eventually pivoting downward over a door side edge of the automobile 80. In this position, the sliding rack 20 may be outfitted with whatever items being transported. Should assistance with holding the load in place, the support plate 100 may be deployed by use of the locking knob 105 to pre-position the support plate 100 in the most usable position as assisted by gravity in a "cradle-like" position. It is envisioned that a user would likely secure each item being transported to each luggage rail 65, 70 and 75 in any one (1) or all combinations by means of C-clamps or nylon straps (not shown).

Upon securement of the item or items to be transported to the sliding rack 20, the user may push the sliding rack 20 back upon the base 15 and secure the same in a stored configuration demonstrated in FIG. 1. It is envisioned that the sliding rack 20 is capable of being removably locked into the stored configuration by either a single locking mechanism (not shown) or a plurality of locking mechanisms (not shown). Upon reaching a given destination, the user may unlock the locking mechanism(s) (not shown), pull the sliding rack 20 out and down to the door side edge of the automobile 80 and safely and comfortably unload the items from the sliding rack 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A sliding roof rack comprising:
a base;
a rack slidably engaging a top of said base comprising:
   a rack first rail;
   a rack second rail;
   a rack first crossmember disposed between said rack first rail and said rack second rail;
   a rack second crossmember disposed between said rack first rail and said rack second rail;
   a plurality of luggage rack luggage rails, each disposed between said rack first rail and said rack second rail; and,
   a pair of sliders secured beneath said rack adjacent each corner of said rack first crossmember and said rack second crossmember;
   wherein said pair of sliders each slidably interact with portions of said base; and,
   wherein said supporting assembly slidably interacts with either said rack first rail or said rack second rail; and,
a supporting assembly pivotally attached to and capable of lengthwise movement along a portion of said rack;
wherein said base is adapted to be removably secured to a roof of an automobile;
wherein said rack is slidingly and movably secured to said base;
wherein a user can adaptably manipulate said rack from a stored position upon said base to a downward angular position adjacent a side of said automobile;
wherein a user can adaptably manipulate said supporting assembly to support a load on said rack; and,
wherein said supporting assembly further comprises:
   a first movable hinge slidably interacting with a respective rack rail;
   a support plate having a first end attached to said first movable hinge and a slot located at a second end;
   a second movable hinge attached to an intermediate location on a first side of said support plate;
   a third movable hinge slidably interacting with a respective rack rail;
   a support brace, having a first end pivotally attached to said second movable hinge and a second end attached to said third movable hinge; and,
   a locking knob attached to said third movable hinge and capable of securing a relative position of said third movable hinge relative to said respective rack rail;
   wherein said locking knob is capable of securing said support plate second end to said respective rail when passing through said slot.
2. The roof rack of claim 1, wherein said base further comprises:

a first rail having a first channel in environmental communication with a first interior hollow portion;
a second rail having a second channel in environmental communication with a second interior hollow portion;
a first crossmember disposed between said first rail and said second rail adjacent a first rail first end and a second rail first end; and,
a second crossmember disposed between said first rail and said second rail adjacent a first rail second end and a second rail second end.

3. The roof rack of claim 2, wherein said first rail, said second rail, said first crossmember, and said second crossmember are connected to form a polygonal frame.

4. The roof rack of claim 2, wherein said rack further comprises:
said rack first rail;
said rack second rail;
said rack first crossmember disposed between said rack first rail and said rack second rail;
said rack second crossmember disposed between said rack first rail and said rack second rail;
said plurality of luggage rack luggage rails each disposed between said first rail and said rack second rail; and,
said pair of sliders secured beneath said rack adjacent each corner of said rack first crossmember and said rack second crossmember;
wherein a first one of said pair of sliders slidably interacts within said first channel;
wherein a second one of said pair of sliders slidably interacts within said second channel; and,
wherein said supporting assembly slidably interacts with either said rack first rail or said rack second rail.

5. The roof rack of claim 4, wherein said rack first rail, said rack second rail, said rack first crossmember, and said rack second crossmember are connected to form a polygonal frame.

6. The roof rack of claim 1, wherein said rack first rail, said rack second rail, said rack first crossmember, and said rack second crossmember are connected to form a polygonal frame.

7. A sliding roof rack comprising:
a base;
a rack slidably engaging a top of said base comprising:
a rack first rail;
a rack second rail;
a rack first crossmember disposed between said rack first rail and said rack second rail;
a rack second crossmember disposed between said rack first rail and said rack second rail;
a plurality of luggage rack luggage rails each disposed between said rack first rail and said rack second rail; and,
a pair of sliders secured beneath said rack adjacent each corner of said rack first crossmember and said rack second crossmember;
wherein said pair of sliders each slidably interact with portions of said base; and,
wherein said first supporting assembly slidably interacts with said rack first rail; and
wherein said second supporting assembly slidably interacts with said rack second rail; and,
a first supporting assembly pivotally attached to and capable of lengthwise movement along a first portion of said rack; and,
a second supporting assembly pivotally attached to and capable of lengthwise movement along a second portion of said rack;
wherein said base is adapted to be removably secured to a roof of an automobile;
wherein said rack is slidingly and movably secured to said base;
wherein a user can adaptably manipulate said rack from a stored position upon said base to a downward angular position adjacent a side of said automobile;
wherein a user can independently adaptably manipulate said first supporting assembly and said second supporting assembly to support a load on said rack;
wherein each supporting assembly further comprises:
a first movable hinge slidably interacting with a respective rack rail;
a support plate having a first end attached to said first movable hinge and a slot located at a second end;
a second movable hinge attached to an intermediate location on a first side of said support plate;
a third movable hinge slidably interacting with a respective rack rail;
a support brace, having a first end pivotally attached to said second movable hinge and a second end attached to said third movable hinge; and,
a locking knob attached to said third movable hinge and capable of securing a relative position of said third movable hinge relative to said respective rack rail;
wherein said locking knob is capable of securing said support plate second end to said respective rail when passing through said slot.

8. The roof rack of claim 7, wherein said base further comprises:
a first rail having a first channel in environmental communication with a first interior hollow portion;
a second rail having a second channel in environmental communication with a second interior hollow portion;
a first crossmember disposed between said first rail and said second rail adjacent a first rail first end and a second rail first end; and,
a second crossmember disposed between said first rail and said second rail adjacent a first rail second end and a second rail second end.

9. The roof rack of claim 8, wherein said first rail, said second rail, said first crossmember, and said second crossmember are connected to form a polygonal frame.

10. The roof rack of claim 8, wherein said rack first rail, said rack second rail, said rack first crossmember, and said rack second crossmember are connected to form a polygonal frame.

11. The roof rack of claim 8, wherein said rack further comprises:
said rack first rail;
said rack second rail;
said rack first crossmember disposed between said rack first rail and said rack second rail;
said rack second crossmember disposed between said rack first rail and said rack second rail;
said plurality of luggage rack luggage rails each disposed between said first rail and said rack second rail; and,
said pair of sliders secured beneath said rack adjacent each corner of said rack first crossmember and said rack second crossmember;
wherein a first one of said pair of sliders slidably interacts within said first channel;
wherein a second one of said pair of sliders slidably interacts within said second channel; and,
wherein said first supporting assembly slidably interacts with said rack first rail; and, wherein said second supporting assembly slidably interacts with said rack second rail.

12. The roof rack of claim 11, wherein said rack first rail, said rack second rail, said rack first crossmember, and said rack second crossmember are connected to form a polygonal frame.

\* \* \* \* \*